(12) United States Patent
Molitor

(10) Patent No.: US 8,544,864 B2
(45) Date of Patent: Oct. 1, 2013

(54) VEHICLE SUSPENSION ASSEMBLY

(75) Inventor: Mark Molitor, Muskegon, MI (US)

(73) Assignee: SAF-HOLLAND, Inc., Holland, MI (US)

( * ) Notice: Subject to any disclaimer, the term of this patent is extended or adjusted under 35 U.S.C. 154(b) by 2080 days.

(21) Appl. No.: 10/757,897

(22) Filed: Jan. 15, 2004

(65) Prior Publication Data

US 2004/0188973 A1  Sep. 30, 2004

Related U.S. Application Data

(60) Provisional application No. 60/440,281, filed on Jan. 15, 2003.

(51) Int. Cl.
*B60G 21/00* (2006.01)

(52) U.S. Cl.
USPC ....... 280/124.166; 280/124.106; 280/124.153

(58) Field of Classification Search
USPC .................. 280/124.166, 124.128, 124.153, 280/124.106, 124.101; 285/412
See application file for complete search history.

(56) References Cited

U.S. PATENT DOCUMENTS

| | | | | |
|---|---|---|---|---|
| 1,984,565 A * | 12/1934 | Bell | | 267/204 |
| 2,052,309 A * | 8/1936 | Kovach | | 267/250 |
| 2,901,240 A * | 8/1959 | Fikse | | 267/189 |
| 2,941,817 A * | 6/1960 | Benson | | 280/86.75 |
| 3,140,880 A * | 7/1964 | Masser | | 280/124.108 |
| 3,220,502 A * | 11/1965 | Muller | | 180/358 |
| 3,406,371 A * | 10/1968 | Buckeridge | | 439/363 |
| 4,166,640 A | 9/1979 | Van Denberg | | |
| 4,632,422 A * | 12/1986 | Csordas et al. | | 280/124.106 |
| 4,667,974 A | 5/1987 | Giese | | |
| 4,756,550 A * | 7/1988 | Raidel | | 280/86.75 |
| 5,711,544 A * | 1/1998 | Buhl | | 280/124.116 |
| 5,718,445 A * | 2/1998 | VanDenberg | | 280/676 |
| 5,820,156 A | 10/1998 | VanDenberg | | |
| 5,882,031 A | 3/1999 | VanDenberg | | |
| 5,924,712 A * | 7/1999 | Pierce | | 280/124.13 |
| 6,059,314 A * | 5/2000 | Streubel et al. | | 280/798 |
| 6,089,583 A * | 7/2000 | Taipale | | 280/124.13 |
| 6,129,367 A | 10/2000 | Bublies et al. | | |

(Continued)

*Primary Examiner* — Paul N Dickson
*Assistant Examiner* — Timothy Wilhelm
(74) *Attorney, Agent, or Firm* — Price Heneveld LLP

(57) ABSTRACT

A vehicle suspension assembly that includes a first control arm having a first end and a second end, wherein the first end of the first control arm is adapted to be pivotally coupled to a first frame member of a vehicle, and wherein the second end of the first control arm is adapted to be pivotally coupled to an axle of the vehicle. The vehicle suspension assembly also includes a second control arm having a first end and a second end, wherein the first end of the second control arm is adapted to be pivotally coupled to a second frame member of the vehicle, wherein the second end of the second control arm is adapted to be pivotally coupled to the axle of the vehicle. The vehicle suspension assembly also includes a rigid first torsional member coupled to the first control arm along a length of the first control arm, and coupled to the second control arm along a length of the second control arm. The vehicle suspension assembly further includes a third control arm having a first end and a second end, wherein the first end of the third control arm is adapted to be pivotally coupled to a third frame member of the vehicle, and wherein the second end of the third control arm is adapted to be pivotally coupled to a select one of the second frame member and the axle of the vehicle.

38 Claims, 12 Drawing Sheets

(56) References Cited

U.S. PATENT DOCUMENTS

| | | | |
|---|---|---|---|
| 6,135,470 A * | 10/2000 | Dudding | 280/124.128 |
| 6,312,006 B1 * | 11/2001 | Svensson | 280/683 |
| 6,328,322 B1 * | 12/2001 | Pierce | 280/124.131 |
| 6,533,299 B2 * | 3/2003 | Platner | 280/124.1 |
| 6,607,205 B2 * | 8/2003 | Platner | 280/124.116 |
| 6,672,604 B2 * | 1/2004 | Eveley | 280/124.128 |
| 6,672,605 B2 * | 1/2004 | Basnett | 280/124.128 |
| 6,832,772 B2 * | 12/2004 | Conover | 280/124.106 |
| 6,851,689 B2 * | 2/2005 | Dudding et al. | 280/124.128 |
| 6,871,862 B2 * | 3/2005 | Chalin | 280/86.5 |
| 6,916,037 B2 * | 7/2005 | Baxter et al. | 280/683 |
| 7,036,805 B2 * | 5/2006 | Renaudot | 267/189 |
| 2001/0030406 A1 * | 10/2001 | Pierce | 280/124.116 |
| 2002/0135151 A1 * | 9/2002 | Schlosser et al. | 280/124.128 |
| 2005/0146110 A1 * | 7/2005 | Dudding | 280/124.128 |

* cited by examiner

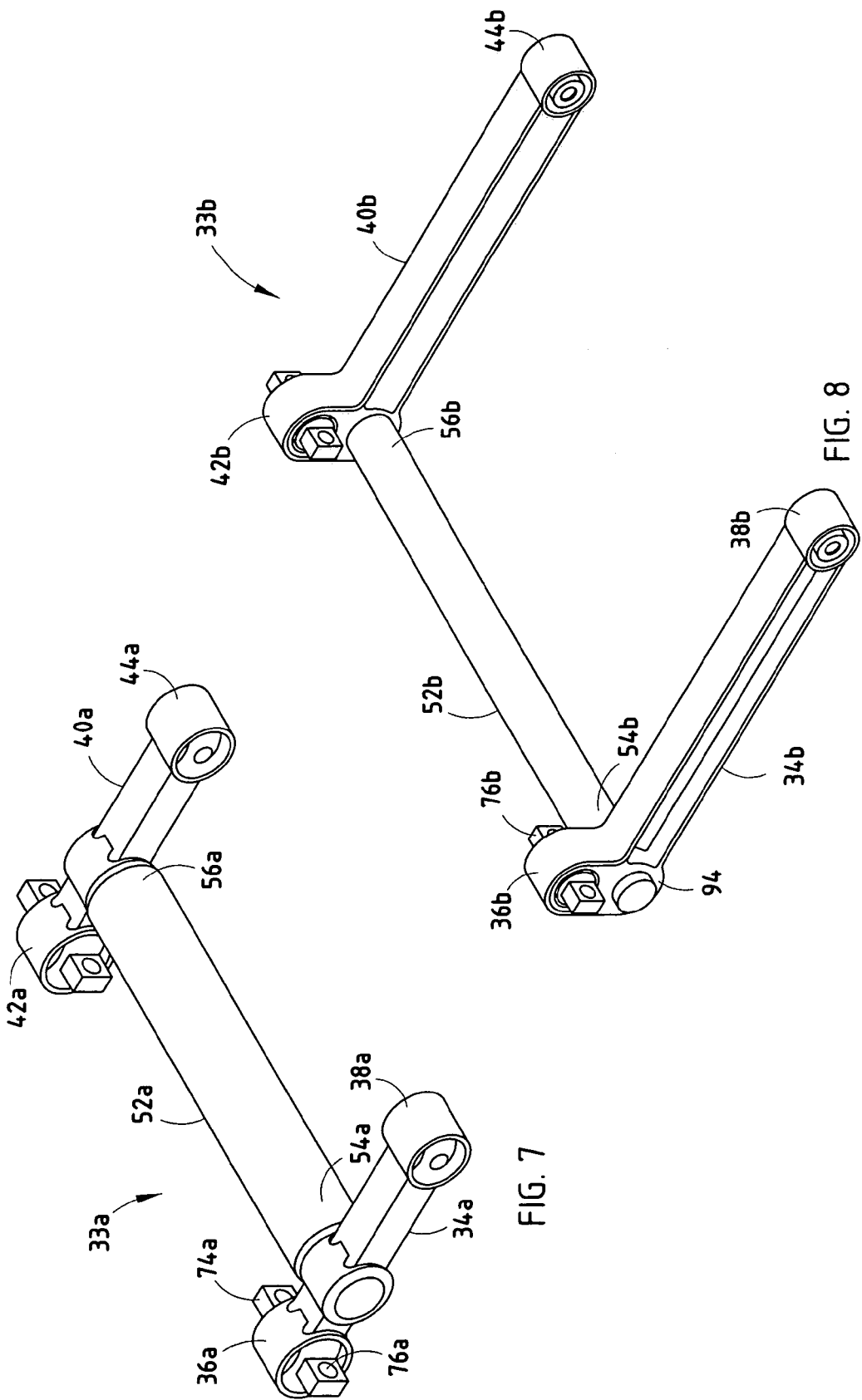

VEHICLE SUSPENSION ASSEMBLY

CROSS REFERENCE TO RELATED APPLICATION

This application claims the benefit of U.S. Provisional Application No. 60/440,281, filed Jan. 15, 2003, entitled VEHICLE SUSPENSION ASSEMBLY, which is hereby incorporated herein by reference in its entirety.

BACKGROUND OF THE INVENTION

The present invention relates to a vehicle suspension assembly, and in particular to a heavy-duty suspension system with increased roll stability and resistance to lateral deflection.

A variety of suspensions utilizing air springs have been developed for use within semi-tractor trailer and other heavy vehicles. These systems control the relative position of the chassis with respect to an associated axle and also to cushion the relative movement of the axle toward the chassis frame. While these systems provide superior cushioning of the chassis over a wide variety of chassis or vehicle loads, conventional air springs by themselves do not typically develop acceptable resistance to vehicle roll, such as experienced when the vehicle negotiates a turn, nor a resistance to lateral shifting of the vehicle, such as experienced during acceleration and deceleration. In general, the lower the spring rate, the greater the cushioning effect, and the lower the roll and lateral shift resistance. Conversely, the higher the spring rate, the higher the roll and lateral shift resistance. While leaf spring suspensions provide adequate roll resistance, they do not provide the same degree of cushions as do air spring systems, particularly when the vehicle is empty or carrying a light load. The rough ride experienced with a leaf spring suspension at low vehicle loads can contribute to cargo and trailer damage as well as human discomfort.

Heretofore, specialized components have been added to air spring systems to reduce roll and lateral shift. However, many of these components add significant weight and cost to the associated suspension system without greatly reducing the roll and lateral shift. Torqueing of the wheel axles has also been utilized to develop roll resistance, however, this solution can sometimes lead to axle failure.

There is a need for a lightweight and inexpensive air spring suspension system that resists roll and lateral shift that will not significantly impact the ride-cushioning characteristics of such suspension system.

SUMMARY OF THE INVENTION

One aspect of the present invention is to provide a vehicle suspension assembly that includes a first control arm having a first end and a second end, wherein the first end of the first control arm is adapted to be pivotally coupled to a first frame member of a vehicle, and wherein the second end of the first control arm is adapted to be pivotally coupled to an axle of the vehicle, and a second control arm having a first end and a second end, wherein the first end of the second control arm is adapted to be pivotally coupled to a second frame member of the vehicle, and wherein the second end of the second control arm is adapted to be pivotally coupled to the axle of the vehicle. The vehicle suspension assembly also includes a third control arm having a first end and a second end, wherein the first end of the third control arm is adapted to be pivotally coupled to a third frame member of the vehicle, and wherein the second end of the third control arm is adapted to be pivotally coupled to the axle of the vehicle, and a rigid torsional member fixedly attached to the first control arm along a length thereof, and fixedly attached to the second control arm along the length thereof.

Another aspect of the present invention is to provide a vehicle suspension assembly that includes first control arm having a first end and a second end, wherein the first end of the first control arm is adapted to be pivotally coupled to a first frame member of a vehicle, and wherein the second end of the first control arm is adapted to be pivotally coupled to an axle of the vehicle, and a second control arm having a first end and a second end, wherein the first end of the second control arm is adapted to be pivotally coupled to a second frame member of the vehicle, and wherein the second end of the control arm is adapted to be pivotally coupled to the axle of the vehicle. The vehicle suspension assembly also includes a third control arm having a first end and a second end, wherein the first end of the third control arm is adapted to be pivotally coupled to a third frame member of the vehicle, and wherein a second end of the third control arm is adapted to be pivotally coupled to the axle of the vehicle, and a fourth control arm having a first end and a second end, wherein the first end of the fourth control arm is adapted to be pivotally coupled to the third frame member of the vehicle, and wherein the second end of the fourth control arm is adapted to be pivotally coupled to the axle of the vehicle. The vehicle suspension assembly further includes a rigid torsional member fixedly attached to a select one of a pairing of the first and second control arms, and the third and fourth control arms.

The present inventive vehicle suspension assembly maintains the ride-cushioning characteristics of an air spring suspension system, while simultaneously increasing roll and lateral shift resistance. The vehicle suspension assembly is more durable, is efficient to use, economical to manufacture, capable of a long operating life, and is particularly well adapted for the proposed use.

These and other advantages of the invention will be further understood and appreciated by those skilled in the art by reference to the following written specification, claims and appended drawings.

BRIEF DESCRIPTION OF THE DRAWINGS

FIG. 7 is a perspective view of a first alternative embodiment of the control arms and torsional member, wherein the torsional member is enlarged;

FIG. 8 is a perspective view of a second alternative embodiment of the control arms and torsional member, wherein the torsional member is located proximate an end of the control arms;

FIG. 15 is a perspective view of the seventh alternative embodiment of the pair of control arms and the torsional member extending therebetween;

DETAILED DESCRIPTION OF THE PREFERRED EMBODIMENTS

Figure 1:
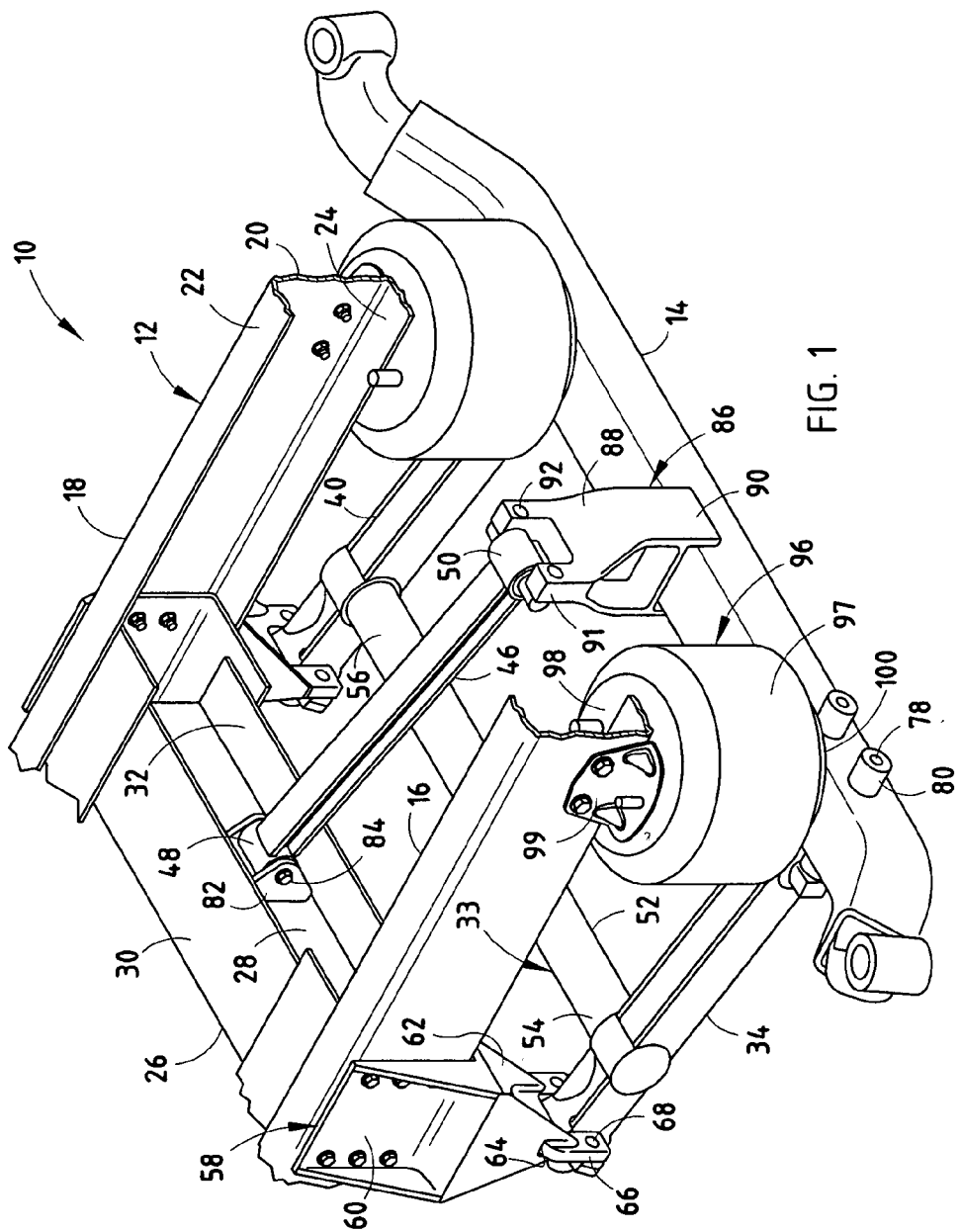
FIG. 1 is a perspective view of a vehicle suspension assembly embodying the present invention.

For purposes of description herein, the terms "upper," "lower," "right," "left," "rear," "front," "vertical," "horizontal," and derivatives thereof shall relate to the invention as oriented in FIG. 1. However, it is to be understood that the invention may assume various alternative orientations and step sequences, except where expressly specified to the contrary. It is also to be understood that the specific devices and processes illustrated in the attached drawings, and described in the following specification are exemplary embodiments of the inventive concepts defined in the appended claims. Hence, specific dimensions and other physical characteristics relating to the embodiments disclosed herein are not to be considered as limiting, unless the claims expressly state otherwise.

The reference numeral 10 (FIG. 1) generally designates a vehicle suspension assembly embodying the present invention, and supporting a vehicle frame 12 above a vehicle axle 14 and a plurality of associated ground contacting wheels (not shown). In the illustrated example, the vehicle frame 12 includes a first rail member 16, and a second rail member 18 extending substantially parallel to the first rail member 16. The first rail member 16 and the second rail member 18 are each provided a C-shaped cross-sectional configuration including a side wall 20, a top wall 22 and a bottom wall 24. The vehicle frame 12 further includes a lateral beam 26 extending orthogonal to the first rail member 16 and the second rail member 18. The lateral beam 26 is provided an I-shaped cross-sectional configuration including a center wall 28, a top wall 30 and a bottom wall 32. It should be noted that the suspension assembly 10 may be used to support other configurations of vehicle frames, and that the vehicle frame 10 is utilized as an example only.

In a first embodiment, the suspension assembly 10 (FIGS. 1 and 2) includes an H-shaped control bar assembly 33 that includes a first control arm 34 having a first end 36 that is pivotally coupled to the first rail member 16, and a second end 38 that is pivotally coupled to the axle 14, as described below. The vehicle suspension assembly 10 also includes a second control arm 40 having a first end 42 that is pivotally coupled to the second rail member 18, and a second end 44 that is pivotally coupled to the axle 14, as described below. A rigid torsional member 52 includes a first end 54 that is fixedly attached to the first control arm 34 along the length of the first control arm 34, and a second end 56 that is fixedly attached to the second control arm 40 along the length of the second control arm 40. The vehicle suspension assembly 10 further includes a third control arm 46 having a first end 48 pivotally coupled to the lateral beam 26, and a second end 50 pivotally coupled to the axle 14, as described below. Although the first control arm 34, the second control arm 40 and the third control arm 46 are shown as substantially parallel to one another, the arms 34, 40 and 46 may also be angled with respect to one another depending on the particular application.

A pair of structural supports or linking members 58 are fixedly attached to and extend downwardly from the first rail member and the second rail member 18. Each linkage member 58 includes an upper plate 60 that is fixedly attached to the associated rail member 16 and 18, and a pair of downwardly-extending, triangularly-shaped arms 62 that are integrally formed with the upper plate 60. The lower end of each arm 62 includes a laterally-extending slot 64 that receives a connector plate 66 that is received therein and fixedly attached thereto. The connector plate 66 is C-shaped and includes a pair of apertures 68 located at the distal ends thereof. Each aperture 68 is adapted to receive mounting hardware therein.

In the illustrated example, each end 36, 38, 42, 44, 48 and 50 of the control arms 34, 40 and 46 includes a bushing and sleeve assembly 70 (FIGS. 3-6). Each bushing and sleeve assembly 70 includes a centrally-located, circularly-shaped aperture 72 extending therethrough that receives a pivot pin 74 therein. As illustrated, each pivot pin 74 includes apertures 76 located at the ends thereof for receiving the associated pivot pin 74 therein, however, other pin-types not requiring retaining hardware may be utilized, including those compatible with shimming. It should be noted that the roll and lateral shift dampening effect of the suspension assembly 10 may be adjusted by replacing the bushing and sleeve assemblies 70 with assemblies having different elastomeric properties, and further that the circularly-shaped aperture 76 within the bushing and sleeve assemblies 70 may be replaced with an elongated aperture, thereby adjusting the ride and related roll stability of the overall suspension assembly 10. Further, the bushing and sleeve assembly 70 may be replaced by other components as known in the art.

In assembly, the pivot pin 74 is placed within the aperture 72 of the bushing and sleeve assembly 70 of a given end 36, 38, 42 and 44 of the first and second control arms 34 and 40. Mounting hardware such as a machined bolt (not shown) is extended through the aperture 68 of connector plate 60 and is received within the aperture 76 of the pivot pin 74, thereby pivotally connecting the first end 36 of the control arm 34 and the first end 42 of the control arm 40 to the first rail member 16 and the second rail member 18, respectively. The pivot pins 74 associated with the second ends 38 of first control arm 34 and the second end 44 of the second control arm 40 are connected with the axle 14 via bolts 78 extending through the apertures 76 of the pivot pin 74 and the axle 14. The bolts 78 are held in position by associated fasteners 80.

The torsional member 52 extends between the first control arm 34 and the second control arm 40 and is fixedly attached thereto along the lengths thereof, and extends substantially orthogonal to the first and second central arms 34 and 40. Specifically, the ends 54 and 56 of the torsional member 52 are received within circularly-shaped pockets 53 located along the length of each of the control arms 34, 40. As illustrated, the torsional member 52 is provided a circular cross-sectional configuration, however, other geometrical configurations may be utilized, such as spring steel plates (not shown) connected to and extending between the first control arm 34 and the second control arm 40, wherein additional plates may be added if additional roll stability is required.

A pair of triangularly-shaped pivot ears 82 extend rearwardly from the center wall 28 of the lateral beam 26 and are attached thereto via welding, bolting or the like. Each pivot ear 82 includes an aperture 84 extending laterally therethrough and is adapted to receive a pivot pin (not shown). In assembly, the first end 48 of the control arm 46 is pivotally coupled with the lateral beam 26 by extending a pivot pin through the apertures 84 of the pivot ears 82 and the central aperture 72 of the associated bushing and sleeve assembly 70. A structural support or linkage member 86 is fixedly attached to and extends upwardly from the axle 14. The linkage member 86 includes a body portion 88, a pair of downwardly-extending legs 90 that receive the axle 14 therebetween and are fixedly attached thereto, and a pair of upwardly-extending arms 91, each having an aperture 92 extending therethrough. In assembly, mounting bolts (not shown) are placed within apertures 76 of the associated pivot pin 74, and are received within the apertures 92 of the arms 91 of the linkage member 86, thereby pivotally coupling the second end 50 of the third control arm 46 with the axle 14.

The suspension assembly 10 further includes a pair of air springs 96 located between the first and second rail members 16 and 18 and the axle 14, respectively. Each air spring 96 includes a flexibly resilient bladder 97, an upper plate 98 fixedly attached to the associated rail member 16 and 18 via a connecter bracket 99, and a bottom plate member 100 fixedly attached to the axle 14. It should be noted that the suspension assembly 10 as disclosed herein may be utilized in a plurality of configurations including hydraulic suspension assemblies, coil spring suspension assemblies, air ride suspension assemblies, two-bag air ride suspension assemblies, four-bag air ride suspension assemblies, and the like.

In a first alternative embodiment, the roll-stability of the suspension assembly 10 (FIG. 7) is adjusted by replacing the torsional member 52 (FIG. 1) with a larger torsional member 52a or a smaller torsional member (not shown). The overall configuration of the suspension assembly 10 remains substantially the same, however, the roll stability of the overall assembly 10 is increased by utilizing the larger torsional member 52a, all other variables remaining constant.

Figure 2:
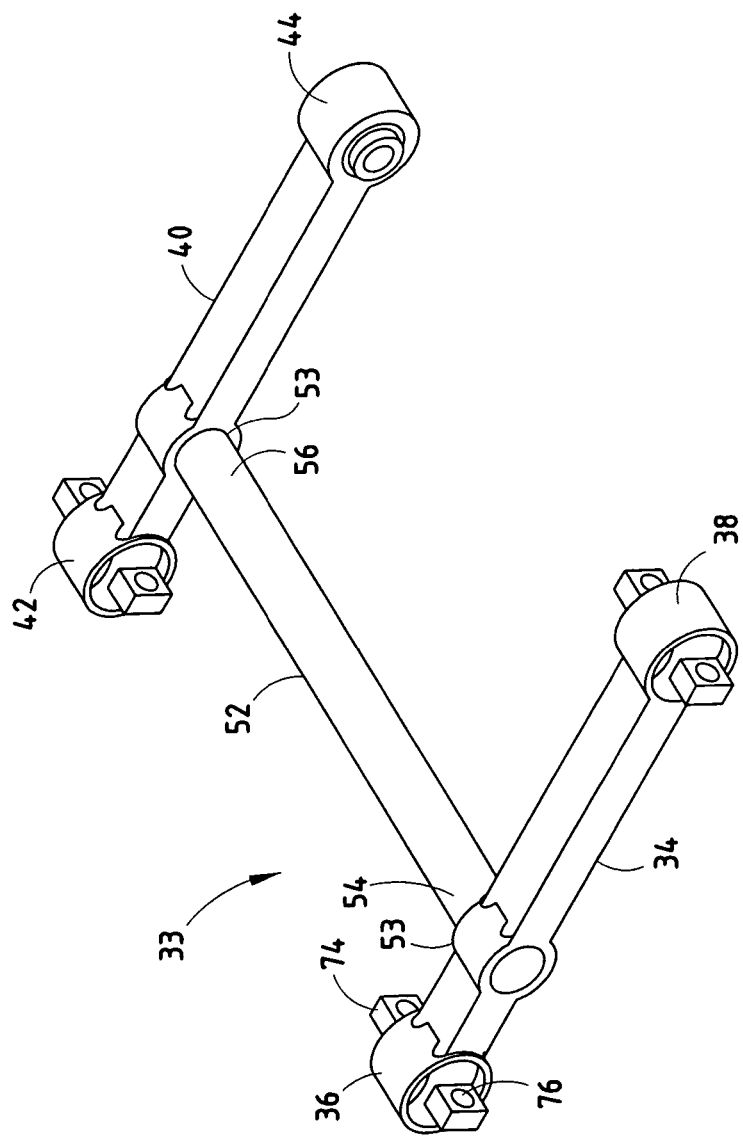
FIG. 2 is a perspective view of a pair of control arms and a torsional member extending therebetween.
Figure 4:
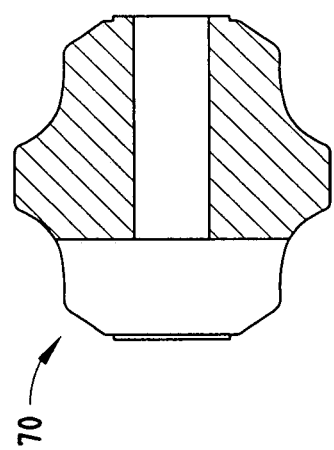
FIG. 4 is a partial cross-sectional top elevational view of the bushing and sleeve assembly, taken along the line IV-IV, FIG. 3.
Figure 6:
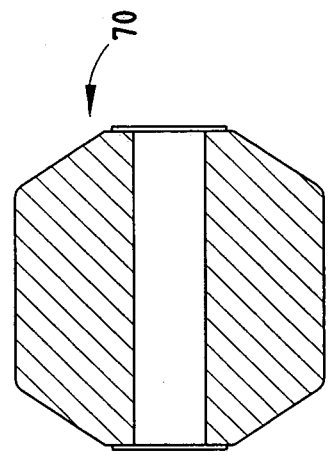
FIG. 6 is a cross-sectional front elevational view of the bushing and sleeve assembly, taken along the line VI-VI, FIG. 5.
Figure 3:
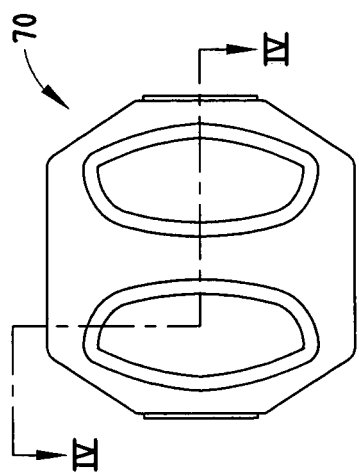
FIG. 3 is a front elevational view of a bushing and sleeve assembly.
Figure 5:
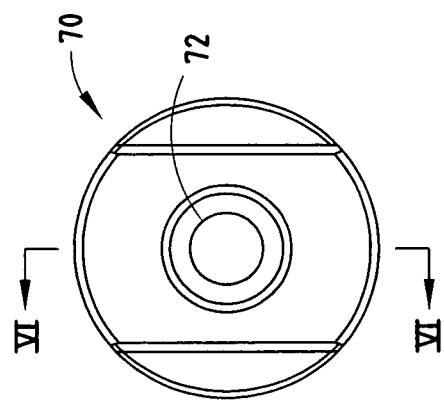
FIG. 5 is a side elevational view of the bushing and sleeve assembly.

The reference numeral 33b (FIG. 8) generally designates a second alternative embodiment of the control bar assembly. Since the control bar assembly 33b is similar to the previously-described control bar assembly 33, similar parts appearing in FIGS. 7 and 2 and FIG. 8 are represented by the same, corresponding reference numeral, except for the suffix "b" in the numerals of the latter. In the illustrated example, the first and second control arms 34 and 40 of the control bar assembly 33 are replaced with L-shaped control arms 34b and 40b, respectively. The overall shape of the control arms 34b and 40b allow the associated torsional member 52b to be located closer to an end of the moment arm as created by each of the control arms 34b and 40b. In the illustrated example, the torsional member 52b is connected to each of the control arms 34b and 40b at an elbow 94 thereof.

Figure 9:
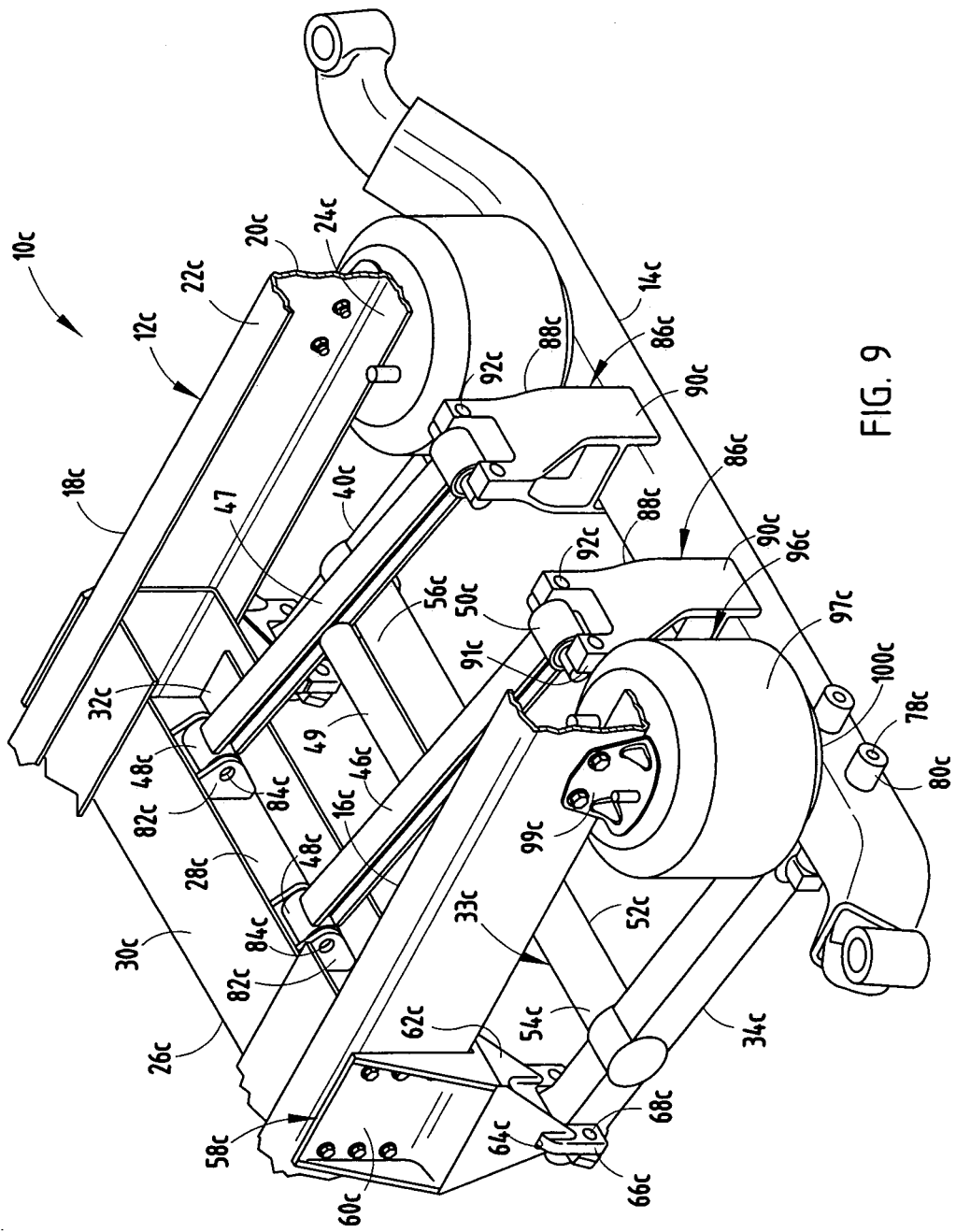
FIG. 9 is a perspective view of a third alternative embodiment of the vehicle suspension assembly including a pair of upper control arms, a pair of lower control arms, and a pair of torsional members.

In a third alternative embodiment, the suspension assembly 10c (FIG. 9) also includes a fourth control arm 47 similar in configuration and assembled similar to the third control arm 46 (FIG. 1). Since the third alternative embodiment of the suspension assembly 10c is similar to the suspension assembly 10, similar parts appearing in FIG. 1 and FIG. 9, are represented by the same, corresponding numerals except for the suffix "c" in the numerals of the latter. In this configuration, the third control arm 46c and the fourth control arm 47 are spaced apart and are each pivotally coupled to the lateral beam 26c and the axle 14c. Further, a torsional member 49 alternatively extends between and is fixedly attached to the third and fourth control arms 46c and 47.

Figure 10:
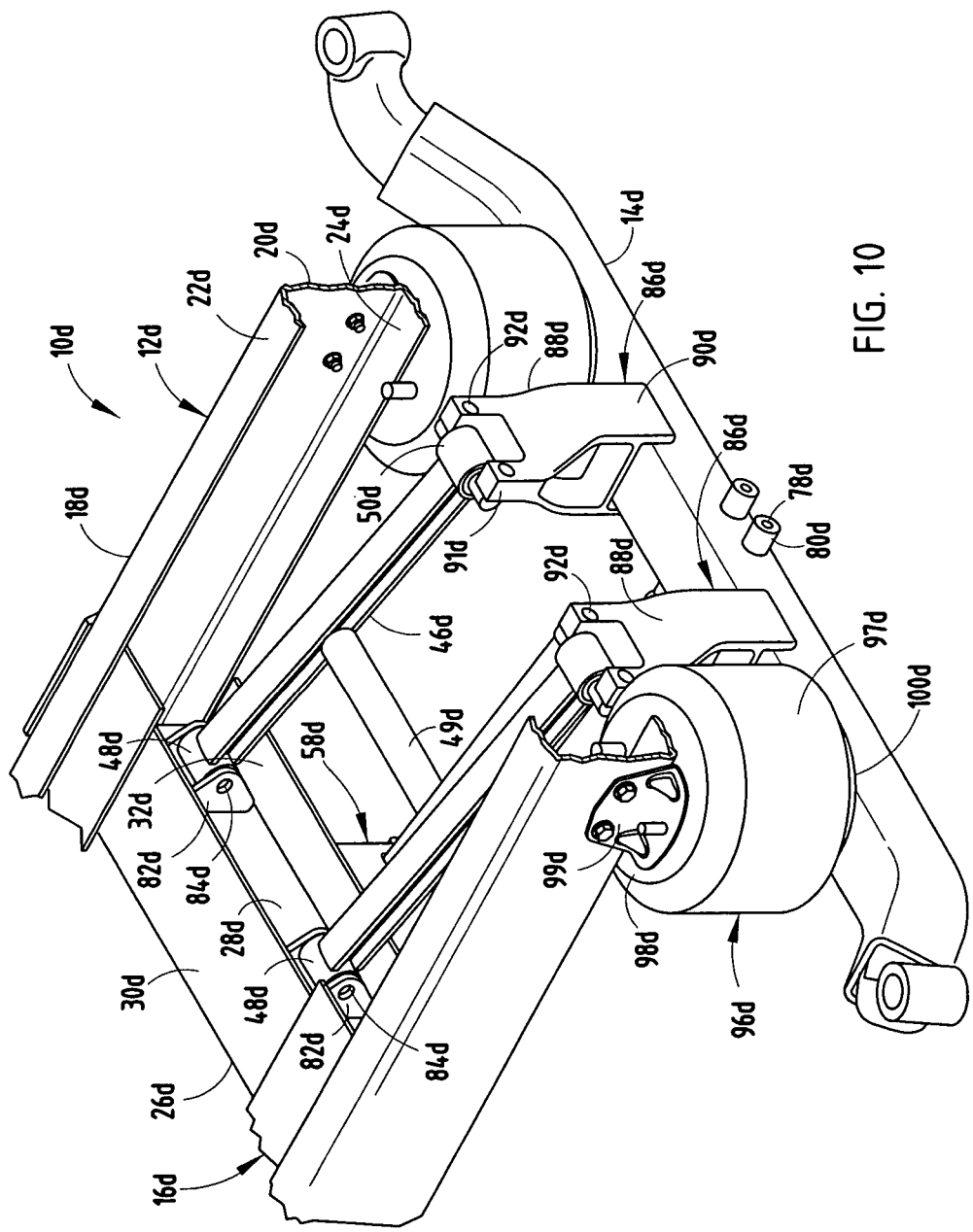
FIG. 10 is a perspective view of a fourth alternative embodiment of the vehicle suspension assembly including a single lower control arm, a pair of upper control arms and a torsional member extending between the upper control arms.

The reference numeral 10d (FIG. 10) generally designates a fourth alternative embodiment of the suspension assembly. Since the fourth alternative embodiment of the suspension assembly 10d is similar to the suspension assembly 10c, similar parts appearing in FIG. 9 and in FIG. 10, are designated by the same, corresponding numerals, except for the suffix "d" in the numerals of the latter. Within this configuration, the second control arm 40c is removed from the assembly 10c (FIG. 9) and a first control arm 34d is positional between the third control arm 46d and the fourth control arm 47d.

Figure 11:
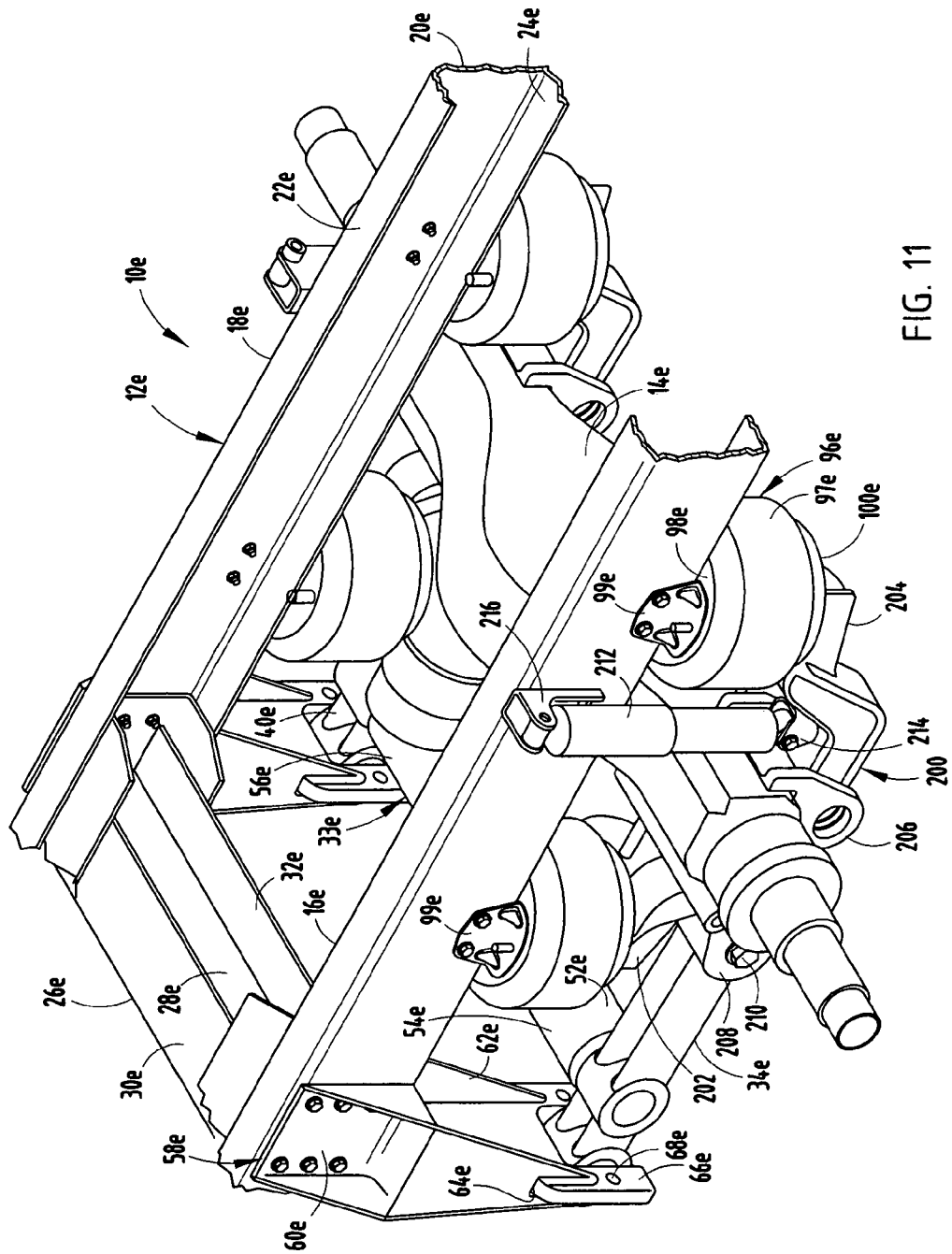
FIG. 11 is a perspective view of a fifth alternative embodiment of the suspension assembly including four separate air springs.

An example of a fifth alternative suspension configuration is illustrated in FIG. 11, wherein a four-bag air ride suspension assembly 10e is utilized. Since the suspension assembly 10e is similar to the previously-described suspension assembly 10, similar parts appearing in FIG. 1 and FIG. 7 are designated by the same, corresponding reference numerals, except for the suffix "e" in the numerals of the latter. In the illustrated example, the suspension assembly 10e includes a pair of U-shaped trailing arms 200 each having a first end 202 and a second end 204 each including an upwardly-facing support plate (not shown). An air spring 96e is located between and affixed to the support plates of each trailing arm 96e and the associated beam 16e, 18e. A support bracket 206 extends upwardly from each trailing arm 200 and is configured to fixedly connect the axle 14e to the trailing arms 200. An adaptor bracket 208 is fixedly connected to each of the support brackets 206 at a first point, and is pivotably connected to an associated control arm 34e, 40e at a second point 210, similar to as described above with respect to the suspension assembly 10. Each trailing arm 200 is pivotably connected to the associated frame member 16e, 18e via a shock absorber 212 that is pivotably connected to the associated trailing arm 200 by a pinned bracket 214 and to the frame member 16e, 18e via a pinned bracket 216.

Figure 12:
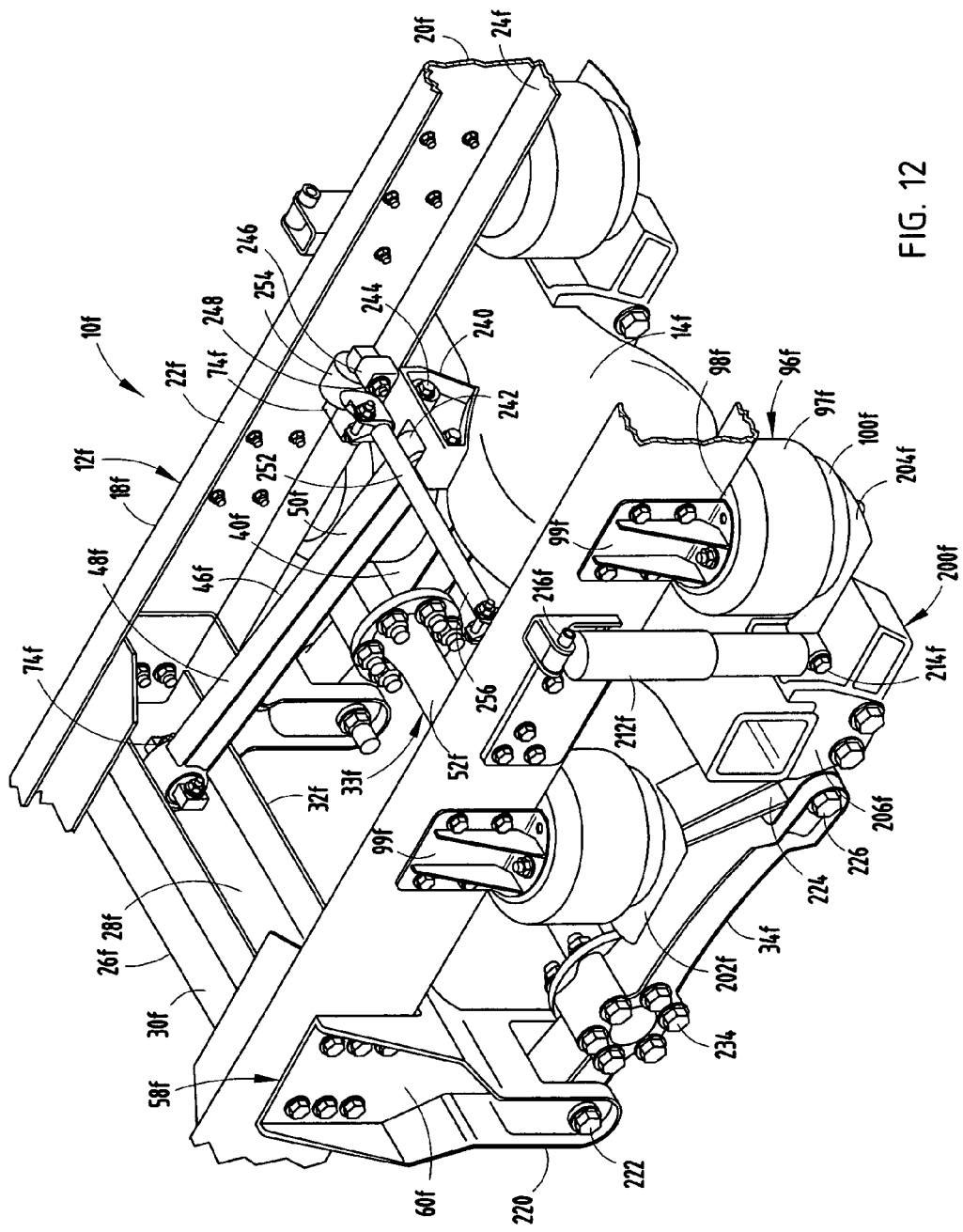
FIG. 12 is a perspective view of a sixth alternative embodiment of the suspension assembly embodying the present invention.

The reference numeral 10f (FIG. 12) generally designates a sixth alternative embodiment of the vehicle suspension assembly embodying the present invention. Since the suspension assembly 10f is similar to the previously described suspension assembly 10e, similar parts appearing in FIG. 11 and FIG. 12 are designated by the same, corresponding reference numeral, except for the suffix "f" in the numerals of the latter. A pair of structural supports or linking members 58f are fixedly attached to and extend downwardly from the first rail member 16f and the second rail member 18f. Each linkage member 58f includes an upper plate 60f that is fixedly attached to the associated rail member 16f and 18f, and a pair of downwardly-extending arms 220 that are integrally formed with the upper plate 60f. The lower end of each arm 62f includes an aperture (not shown) that receives a pivot pin 222 therethrough. The trailing arms 200f each include a boss 224 that receives a pivot pin 226 therethrough.

Figure 13:
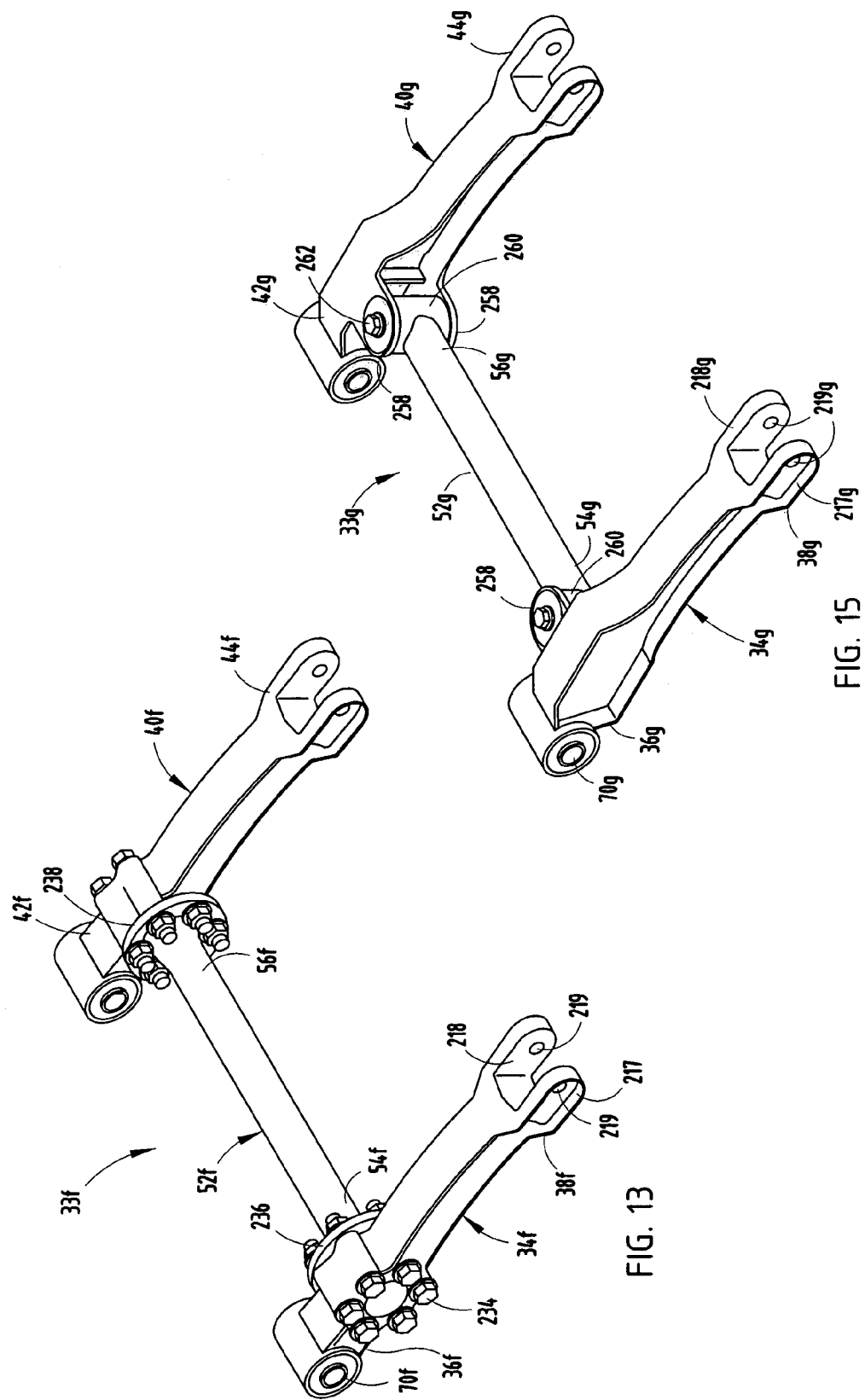
FIG. 13 is a perspective view of the sixth alternative embodiment of the pair of control arms and the torsional member extending therebetween.

In the illustrated example, the suspension assembly 10f includes a control bar assembly 33f (FIG. 13) that includes a first control arm 34f having a first end 36f that is pivotally coupled to the first rail member 16f, and a second end 38f that is pivotally coupled to the axle 14f, as described below. The control arm assembly 33f also includes a second control arm 40f having a first end 42f that is pivotally coupled to the second rail member 18f, and a second end 44f that is pivotally coupled to the axle 14f, as described below. The second end 38f, 44f of each control arm 34f, 40f includes a pair of spaced-apart fingers 217 and 218, each having an aperture 219 extending therethrough for receiving bolts 226 therein, as described below. Each control arm 34f, 40f includes a hub 232 spaced about the length thereof. Each hub 232 is cylindrically-shaped and includes a plurality of apertures (not shown) spaced circumferentially thereabout that receives bolts 234 therethrough. The vehicle suspension assembly 10f further includes a third control arm 46f having a first end 48f pivotally coupled to the lateral beam 26f, and a second end 50f pivotally coupled to a coupling assembly 230 that pivotally couples the second end 50f to the first rail member 16f. A rigid torsional member 52f includes an integrally formed, circularly-shaped mounting plate 236 located at a first end 54f, and that includes a plurality of circumferentially-spaced apertures (not shown), and that is fixedly attached to the hub 232 of the first control arm 34f by the bolts 234. The torsional member 52f also includes an integrally-formed, circularly-shaped mounting plate 238 located at a second end 56f, and that includes a plurality of circumferentially-spaced apertures (not shown), and that is fixedly attached to the hub 232 of the second control arm 40f by the bolts 234.

The coupling assembly 230 includes a triangularly-shaped body member 240 having a recess 242 that receives the second end 50f of the third control arm 46f, and a pair of apertures (not shown) for receiving bolts 244 to connect a pivot pin (not shown) to the body member 240, as described below. The body member 240 also includes a pair of upwardly-extending, spaced-apart ears 246, each having an aperture (not shown) extending therethrough for receiving bolts 248 and connecting a pivot pin 250 to the body member 240. A linkage bar 252 is pivotably connected to the pivot pin 74f at a first end 254, and fixedly connected to the frame member 16f at a second end 256.

In the illustrated example, the ends 36f, 42f, 48f and 50f of the control arms 34f, 40f and 46f, the first end 254 of the linkage bar 252, and the bosses 224 of the trailing arms 200e each include a bushing and sleeve assembly 70f, similar to the bushing and sleeve assembly 70 discussed above with respect to suspension assembly 10 (FIG. 1).

In assembly, the pivot pin 74f is placed within the apertures 72f of the bushing and sleeve assemblies 70f of any given end 36f, 42f and 48f of the first, second and third control arms 34f, 40f and 46f. Mounting hardware such as bolts 222, 226, 244 and 248 are received within apertures 76f of each pivot pin 74f, thereby pivotally connecting the first end 36f of the control arm 34f and the first end 42f of the control arm 40f with the first rail member 16f and the second rail member 18f, respectively, the first end 48 of the third control arm 46f with the lateral beam 26, and the first end 254 of the linkage bar 252 with the body member 244.

Figure 14:
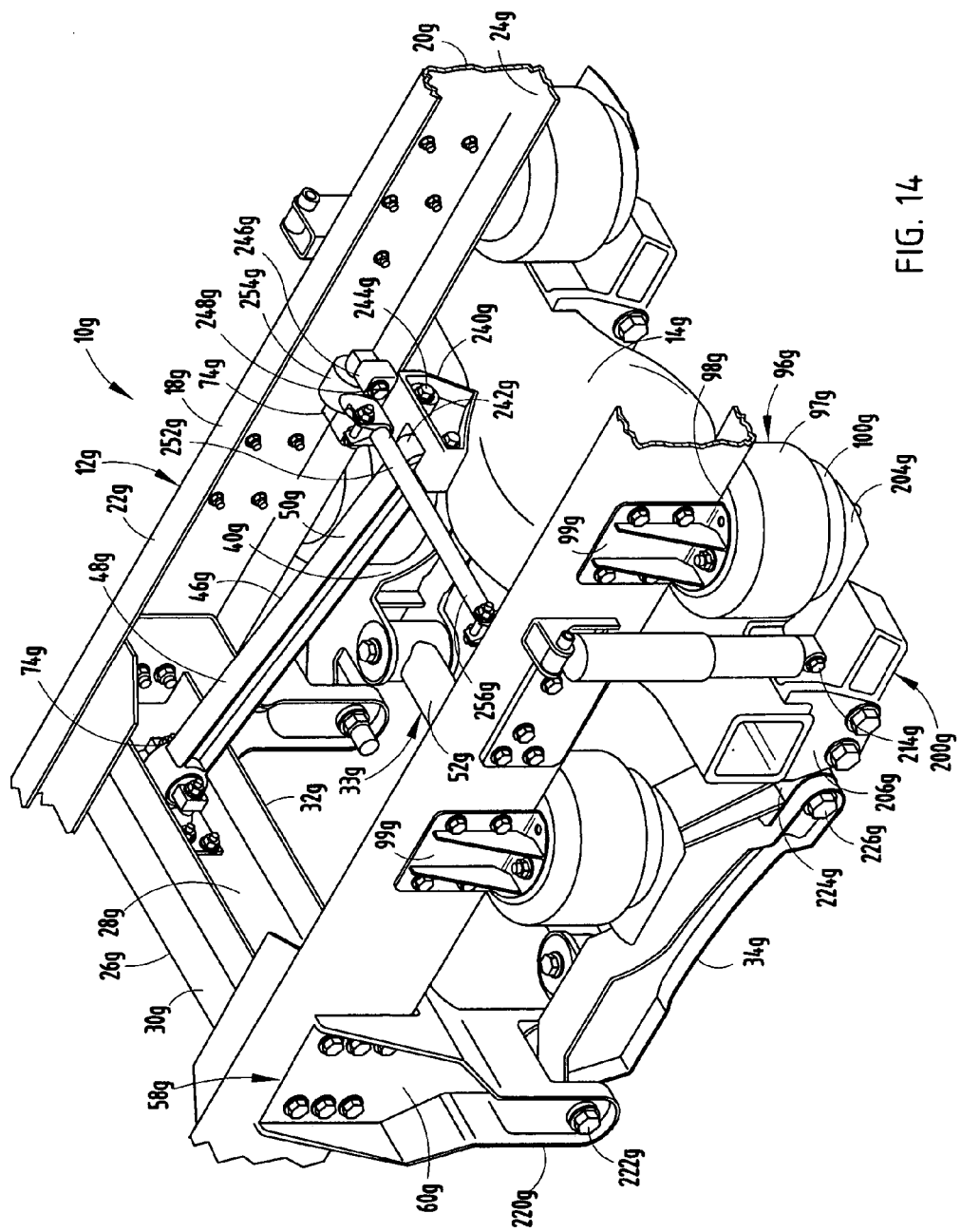
FIG. 14 is a perspective view of the seventh alternative embodiment of the suspension assembly embodying the present invention.

The reference numeral 10g (FIG. 14) generally designates a seventh alternative embodiment of the vehicle suspension assembly embodying the present invention. Since the suspension assembly 10g is similar to the previously described suspension assembly 10f, similar parts appearing in FIG. 12 and FIG. 14 are represented by the same, corresponding reference numeral, except for the suffix "g" in the numeral of the latter.

In the illustrated example, the control arm 33g (FIG. 15) of the suspension assembly 10g includes a first control arm 34g having a first end 36g that is pivotally coupled to the first rail member 16g, and a second end 38g that is pivotally coupled to the axle 14g, as described below. The control arm assembly 33g also includes a second control arm 40g having a first end 42g that is pivotally coupled to the second rail member 18g, and a second end 44g that is pivotally coupled to the axle 14g, as described below. Each control arm 34g, 40g includes a pair of inwardly-extending flanges 258. A rigid torsional member 52g includes a first end 54g, that is pivotally coupled to the first control arm 34g along the length of the first control arm 34g, and a second end 56g that is pivotally coupled to the second control arm 40g along the length of the second control arm 40g. Specifically, the first end 54g and the second end 56g of the torsional member 52g each include a vertically oriented bushing sleeve 260 having a busing (not shown) therein. In assembly, a bolt 262 pivotally couples the first and second ends 54g, 56g between the flanges 258 of the associated control arm 34g, 40g. It should be noted that the flanges 258 of each control arm 34g, 42g may be located at any position along the length of the associated control arm 34g, 36g.

Figure 16:
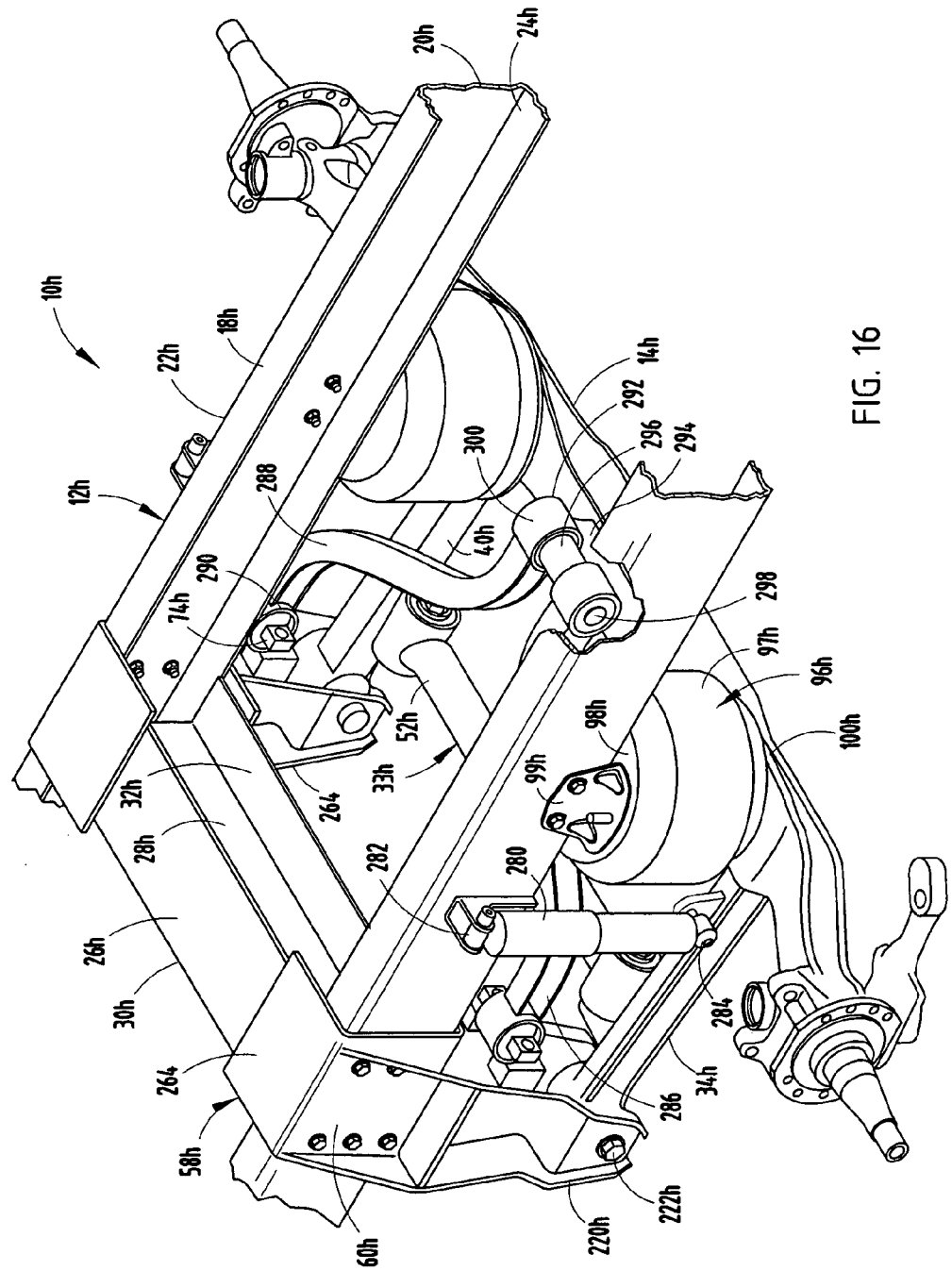
FIG. 16 is a perspective view of an eighth alternative embodiment of the suspension assembly embodying the present invention and including a pair of tracking rods.

The reference numeral 10h (FIG. 16) generally designates an eighth alternative embodiment of the vehicle suspension assembly embodying the present invention. Since the suspension assembly 10h is similar to the previously-described suspension assemblies 10 and 10g, similar parts appearing in FIGS. 1 and 14 and FIG. 16 are represented by the same corresponding reference numerals except for the suffix "h" in the numerals of the latter. As illustrated, the structural supports 58h each include a pair of inwardly-extending arms 264. In assembly, each support 58h is positioned such that the associated rail 16h, 18h is positioned between the arms 264 of the support 58h, that are subsequently affixed to the associated rail 16h, 18h.

Figure 17:
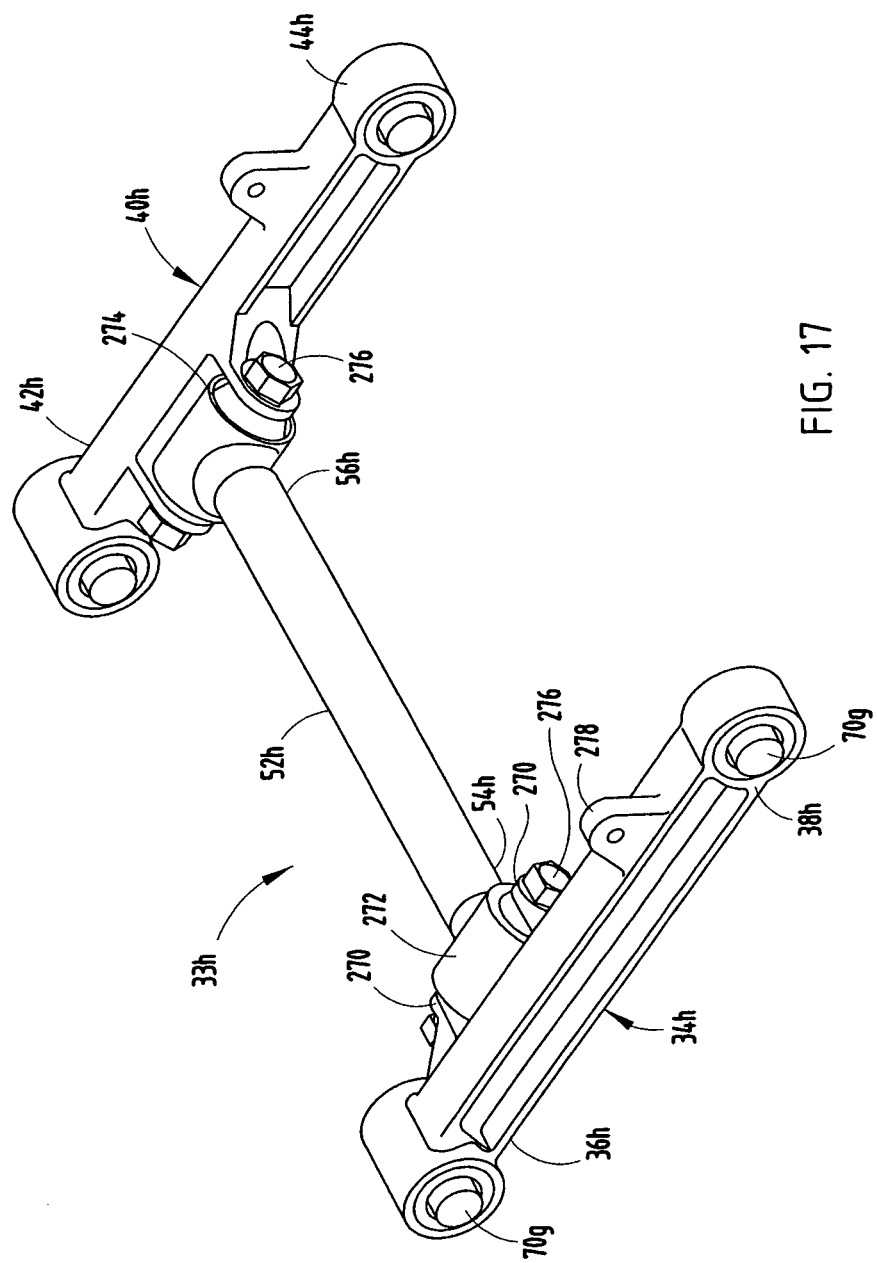
FIG. 17 is a perspective view of the eighth alternative embodiment of the pair of control arms and the torsional member extending therebetween.

In the illustrated example, the control arm assembly 33h (FIG. 17) of the suspension assembly 10 includes a first control arm 34h having a first end 36h that is pivotally coupled to the first rail member 16h via one of the supports 58h, and a second end 38h that is pivotally coupled to the axle 14h, as described below. The control arm assembly 33h also includes a second control arm 40h having a first end 42h that is pivotally coupled to the second rail member 18h via one of the supports 58h, and a second end 44h that is pivotally coupled to the axle 14h, as described below. Each end 36h, 38h is configured similarly to the end 36g of the arms 34g, 40g as described above. Each control arm 34h, 40h includes a pair of inwardly-extending flanges 270. A rigid torsional member 52h includes a first end 54h that is pivotally coupled to the first control arm 34h along the length of the first control arm 34h, and a second end 56h that is pivotally coupled to the second control arm 40h along the length of the second control arm 40h. Specifically, the first end 54h and the second end 56h of the torsional member 52h each include a vertically oriented bushing sleeve 272 housing a bushing 274 therein. In assembly, a bolt 276 pivotally couples the first and second ends 54h, 56h between the flanges 270 of the associated control arm 34h, 40h. It should be noted that the flanges 270 of each control arm 34h, 40h may be located at any position along the length of the associated control arm 34h, 36h. Each control arm 34h, 40h includes an upwardly-extending tab 278. In assembly, each arm 34h, 40h is pivotably coupled to an associated rail 16h, 18h by a shock absorber 280 having a first end 282 pivotably coupled to the associated rail and a second end 284 pivotably coupled to the associated tab 270.

The suspension assembly 33h further includes a third control arm 286 and a fourth control arm 288 each having a first end 290 pivotably coupled to an associated support 58h, and a second end 292 pivotably coupled to the axle 14h. Specifically, the first end 290 of the third and fourth control arm 286, 288 is pivotably connected to an associated support 58h at a position located between the upper plate 60 and the associated arms 220h. A coupling assembly 294 includes a base 296 fixedly attached to the axle 14h and a pair of bosses 298 extending upwardly therefrom. The end 292 of each arm 34h, 40h includes a bushing sleeve 300 housing a bushing (not shown) therein that pivotably receives the associated boss 298 therein.

The present inventive vehicle suspension assembly described herein provides an air spring suspension system with increased roll and lateral shift resistance. Further, the assembly is lightweight, capable of a long operating life, and is particularly well adapted for the proposed use.

In the foregoing description, it will be readily appreciated by those skilled in the art that modifications may be made to the invention without departing from the concepts disclosed herein. Such modifications are to be considered as included in the following claims, unless these claims by their language expressly state otherwise.

The invention claimed is:

1. A vehicle suspension assembly, comprising:
    a first control arm having a first end and a second end, wherein the first end of the first control arm includes a first bushing adapted to pivotally couple the first control arm to a first frame member of a vehicle, and wherein the second end of the first control arm is adapted to be pivotally coupled to an axle of a vehicle;
    a second control arm having a first end and a second end, wherein the first end of the second control arm includes a second bushing adapted to pivotally couple the second control arm to a second frame member of the vehicle, and wherein the second end of the second control arm is adapted to be pivotally coupled to an axle of the vehicle;
    a rigid first torsional member coupled to the first control arm along a length of the first control arm rearward of the first bushing and forward of an axle, and coupled to the second control arm along a length of the second control arm rearward of the second bushing and forward of an axle, wherein the first torsional member is fixedly coupled to the first control arm proximate the first end of the first control arm, and wherein the torsional member is fixedly coupled to the second control arm proximate the first end of the second control arm; and
    a third control arm having a first end and a second end, wherein the first end of the third control arm is adapted to be pivotally coupled to a third frame member of a vehicle, and wherein the second end of the third control arm is adapted to be pivotally coupled to at least a select one of the second frame members and an axle of a vehicle.

2. The vehicle suspension assembly of claim 1, wherein the first torsional member is tube-shaped.

3. The vehicle suspension assembly of claim 1, wherein the first end of the first control arm is adapted to be pivotally coupled with a first linkage member that is fixedly attached to and extends downwardly from the first frame member.

4. The vehicle suspension assembly of claim 3, wherein the first end of the second control arm is adapted to be pivotally coupled with a second linkage member that is fixedly attached to and extends downwardly from the second frame member.

5. The vehicle suspension assembly of claim 4, wherein the second end of the third control arm is adapted to be pivotally coupled with a third linkage member that is fixedly attached to and extends upwardly from an axle.

6. The vehicle suspension assembly of claim 1, wherein the first bushing of the first end of the first control arm and the second bushing of the first end of the second control arm are each elastically deformable, and wherein the second end of the first control arm and the second control arm each include an elastically deformable bushing.

7. The vehicle suspension assembly of claim 6, wherein the bushings of the first and second ends of the first and second control arms each have an aperture extending therethrough, and wherein each aperture is elongated.

8. The vehicle suspension assembly of claim 6, wherein the first and second end of the third control arm each include an elastically deformable bushing.

9. The vehicle suspension assembly of claim 1, wherein the first torsional member includes a first flanged end and a second flanged end, and the first flanged end is fixedly coupled to the first control arm via at least one bolt extending through at least one aperture in the first flanged end and at least one aperture in the first control arm, and wherein the second flanged end is fixedly coupled to the second control arm via at least one bolt extending through at least one aperture in the second flanged end and at least one aperture in the second control arm.

10. The vehicle suspension assembly of claim 1, further including:
    a first pneumatic suspension bag adapted to be positioned between the first frame member and an axle; and
    a second pneumatic suspension bag adapted to be positioned between the second frame member and an axle.

11. The vehicle suspension assembly of claim 10, further including:
    a third pneumatic suspension bag positioned between the first frame member and an axle; and
    a fourth pneumatic suspension bag positioned between the second frame member and an axle.

12. The vehicle suspension assembly of claim 1, further including:
    a fourth control arm having a first end and a second end, wherein the first end of the fourth control arm is adapted to be pivotally coupled to the third frame member of a vehicle, and wherein the second end of the fourth control arm is adapted to be pivotally coupled to an axle of a vehicle.

13. The vehicle suspension assembly of claim 12, further including:
    a rigid second torsional member fixedly attached to the third control arm along a length of the third control arm, and fixedly attached to the fourth control arm along a length of the fourth control arm.

14. The vehicle suspension assembly of claim 1, wherein the first and the second control arms are each substantially L-shaped defining an elbow along the length of each of the control arms.

15. The vehicle suspension assembly of claim 14, wherein the first torsional member is fixedly coupled to the first and second control arms proximate the elbows thereof.

16. The vehicle suspension assembly of claim 1, wherein the second end of the first control arm and the second end of the second control arm are each substantially fork-shaped.

17. A vehicle suspension assembly, comprising:
    a first control arm having a first end and a second end, wherein the first end of the first control arm includes a first bushing adapted to pivotally couple the first control arm to a first frame member of a vehicle, and wherein the second end of the first control arm is adapted to be pivotally coupled to an axle of a vehicle;
    a second control arm having a first end and a second end, wherein the first end of the second control arm includes a second bushing adapted to pivotally couple the second control arm to a second frame member of the vehicle, and wherein the second end of the second control arm is adapted to be pivotally coupled to an axle of the vehicle;

a rigid first torsional member coupled to the first control arm along a length of the first control arm rearward of and proximate to the first bushing and forward of an axle, and coupled to the second control arm along a length of the second control arm rearward of and proximate to the second bushing and forward of an axle, wherein the torsional member is pivotably coupled to the first control arm, and wherein the first torsional member is pivotably coupled to the second control arm; and a third control arm having a first end and a second end, wherein the first end of the third control arm is adapted to be pivotally coupled to a third frame member of a vehicle, and wherein the second end of the third control arm is adapted to be pivotally coupled to at least a select one of the second frame members and an axle of a vehicle.

18. The vehicle suspension assembly of claim 17, wherein the first torsional member is pivotable with respect to the first and second control arms in a substantially vertical direction.

19. The vehicle suspension assembly of claim 17, wherein the first torsional member is pivotable with respect to the first and second control arms in a substantially horizontal direction.

20. A vehicle suspension assembly, comprising:
a first control arm having a first end and a second end, wherein the first end of the first control arm is adapted to be pivotally coupled to a first frame member of a vehicle, and wherein the second end of the first control arm is adapted to be pivotally coupled to an axle of a vehicle;
a second control arm having a first end and a second end, wherein the first end of the second control arm is adapted to be pivotally coupled to the first frame member of a vehicle, and wherein the second end of the second control arm is adapted to be pivotally coupled to an axle of a vehicle;
a rigid first torsional member fixedly coupled to the first control arm along a length of the first control arm, and fixedly coupled to the second control arm along a length of the second control arm; and
a third control arm having a first end and a second end, wherein the first end of the third control arm is adapted to be pivotally coupled to a select one of the first frame member, a second frame member, and a third frame member of a vehicle, and wherein the second end of the third control arm is adapted to be pivotally coupled to an axle of a vehicle wherein the third control arm is positioned between the first and second control arms, and wherein the third control arm is pivotally coupled with the first frame member.

21. The vehicle suspension assembly of claim 20, wherein the torsional member is tube-shaped.

22. The vehicle suspension assembly of claim 20, wherein the first end of the first control arm is adapted to be pivotally coupled with a first linkage member that is fixedly attached to and extends upwardly from an axle.

23. The vehicle suspension assembly of claim 22, wherein the first end of the second control arm is adapted to be pivotally coupled with a second linkage member that is fixedly attached to and extends upwardly from an axle.

24. The vehicle suspension assembly of claim 20, wherein the first and second end of the first control arm and the first and second end of the second control arm each include an elastically deformable bushing.

25. The vehicle suspension assembly of claim 24, wherein the first and second end of the third control arm each include an elastically deformable bushing.

26. The vehicle suspension assembly of claim 20, wherein the first end of the third control arm is adapted to be pivotably coupled to the second frame member, and further including:
a fourth control arm having a first end and a second end, wherein the first end of the fourth control arm is adapted to be pivotally coupled to the third frame member of a vehicle, and wherein the second end of the fourth control arm is adapted to be pivotally coupled to an axle of a vehicle.

27. A vehicle suspension assembly, comprising:
a first control arm having a first end and a second end, wherein the first end of the first control arm is adapted to be pivotally coupled to a first frame member of a vehicle, and wherein the second end of the first control arm is adapted to be pivotally coupled to an axle of a vehicle;
a second control arm having a first end and a second end, wherein the first end of the second control arm is adapted to be pivotally coupled to the first frame member of a vehicle, and wherein the second end of the second control arm is adapted to be pivotally coupled to an axle of a vehicle;
a rigid first torsional member coupled to the first control arm along a length of the first control arm proximate the first end of the first control arm, and coupled to the second control arm along a length of the second control arm proximate the first end of the second control arm; and
a third control arm having a first end and a second end, wherein the first end of the third control arm is adapted to be pivotally coupled to a select one of the first frame member, a second frame member, and a third frame member of a vehicle, and wherein the second end of the third control arm is adapted to be pivotally coupled to an axle of a vehicle wherein the torsional member is pivotably coupled to the first control arm, and wherein the first torsional member is pivotably coupled to the second control arm.

28. The vehicle suspension assembly of claim 27, wherein the first torsional member is pivotable with respect to the first and second control arms in a substantially vertical direction.

29. The vehicle suspension assembly of claim 28, wherein the first torsional member is pivotable with respect to the first and second control arms in a substantially horizontal direction.

30. A vehicle suspension assembly, comprising:
a first control arm having a first end and a second end, wherein the first end of the first control arm includes a first bushing adapted to pivotally couple the first control arm to a first frame member of a vehicle, and wherein the second end of the first control arm is adapted to be pivotally coupled to an axle of a vehicle;
a second control arm having a first end and a second end, wherein the first end of the second control arm includes a second bushing adapted to pivotally couple the second control arm to a second frame member of the vehicle, and wherein the second end of the second control arm is adapted to be pivotally coupled to the an axle of the vehicle;
a rigid first torsional member coupled to the first control arm along a length of the first control arm rearward of the first bushing and forward of an axle, and coupled to the second control arm along a length of the second control arm rearward of the second bushing and forward of an axle wherein the torsional member is pivotably coupled to the first control arm, and wherein the first torsional member is pivotally coupled to the second control arm.

31. The vehicle suspension assembly of claim 30, wherein the first torsional member is pivotable with respect to the first and second control arms in a substantially vertical direction.

32. The vehicle suspension assembly of claim 30, wherein the first torsional member is pivotable with respect to the first and second control arms in a substantially horizontal direction.

33. A vehicle suspension assembly, comprising:
a first control arm having a first end and a second end, wherein the first end of the first control arm includes a first bushing adapted to pivotally couple the first control arm to a first frame member of a vehicle, and wherein the second end of the first control arm is adapted to be pivotally coupled to an axle of a vehicle;
a second control arm having a first end and a second end, wherein the first end of the second control arm includes a second bushing adapted to pivotally couple the second control arm to a second frame member of the vehicle, and wherein the second end of the second control arm is adapted to be pivotally coupled to an axle of the vehicle;
a rigid first torsional member coupled to the first control arm along a length of the first control arm rearward of the first bushing and forward of an axle, and coupled to the second control arm along a length of the second control arm rearward of the second bushing and forward of an axle, wherein the first torsional member is coupled to the first control arm at a location along a length of the first control arm that is closer to the first end of the first control arm than to a mid-point of the first control arm, and wherein the torsional member is coupled to the second control arm at a location along a length of the second control arm that is closer to the first end of the second control arm than to a midpoint of the second control arm; and
a third control arm having a first end and a second end, wherein the first end of the third control arm is adapted to be pivotally coupled to a third frame member of a vehicle, and wherein the second end of the third control arm is adapted to be pivotally coupled to at least a select one of the second frame members and an axle of a vehicle.

34. The vehicle suspension assembly of claim 33, wherein the first torsional member is rotatably coupled to the first and second control arms.

35. A vehicle suspension assembly, comprising:
a first control arm having a first end and a second end, wherein the first end of the first control arm includes a first bushing adapted to pivotally couple the first control arm to a first frame member of a vehicle, and wherein the second end of the first control arm is adapted to be pivotally coupled to an axle of a vehicle;
a second control arm having a first end and a second end, wherein the first end of the second control arm includes a second bushing adapted to pivotally couple the second control arm to a second frame member of the vehicle, and wherein the second end of the second control arm is adapted to be pivotally coupled to an axle of the vehicle; and
a rigid first torsional member coupled to the first control arm along a length of the first control arm rearward of the first bushing and forward of an axle, and coupled to the second control arm along a length of the second control arm rearward of the second bushing and forward of an axle, wherein the first torsional member is coupled to the first control arm at a location along a length of the first control member that is closer to a selective one of the first and second ends of the first control arm than to a mid-point of the first control arm, and wherein the torsional member is coupled to the second control arm proximate the first end of the second control arm.

36. The vehicle suspension assembly of claim 35, wherein the first torsional member is rotatably coupled to the first and second control arms.

37. The vehicle suspension assembly of claim 35, wherein the first torsional member is fixedly coupled to the first and second control arms.

38. The vehicle suspension assembly of claim 35, further including:
a third control arm having a first end and a second end, wherein the first end of the third control arm is adapted to be pivotally coupled to a third frame member of a vehicle, and wherein the second end of the third control arm is adapted to be pivotally coupled to at least a select one of a first frame member, a second frame member and an axle of a vehicle.

\* \* \* \* \*